(12) United States Patent
Kunkati et al.

(10) Patent No.: US 12,069,445 B2
(45) Date of Patent: Aug. 20, 2024

(54) PUBLIC ADDRESS SYSTEM ACTION AUDITING

(71) Applicant: Honeywell International Inc., Charlotte, NC (US)

(72) Inventors: Suneel Kunkati, Bengaluru (IN); Siva Sankar Mathuraju, Bangalore (IN)

(73) Assignee: Honeywell International Inc., Charlotte, NC (US)

( * ) Notice: Subject to any disclaimer, the term of this patent is extended or adjusted under 35 U.S.C. 154(b) by 170 days.

(21) Appl. No.: 17/737,239

(22) Filed: May 5, 2022

(65) Prior Publication Data

US 2023/0362567 A1    Nov. 9, 2023

(51) Int. Cl.
  *H04R 29/00* (2006.01)
  *G06F 11/07* (2006.01)
  *G06F 11/34* (2006.01)
  *H04R 27/00* (2006.01)

(52) U.S. Cl.
  CPC ....... *H04R 29/007* (2013.01); *G06F 11/0706* (2013.01); *G06F 11/3476* (2013.01); *H04R 27/00* (2013.01)

(58) Field of Classification Search
  CPC ... H04R 29/007; H04R 27/00; G06F 11/0706; G06F 11/3476
  See application file for complete search history.

(56) References Cited

U.S. PATENT DOCUMENTS

| | | | |
|---|---|---|---|
| 9,251,472 B1 | 2/2016 | Linowes et al. | |
| 2011/0268286 A1* | 11/2011 | Sanchez | H04R 27/00 709/227 |
| 2012/0286946 A1* | 11/2012 | Karl | G08B 29/126 340/514 |
| 2018/0233165 A1* | 8/2018 | Atkinson | G06F 3/165 |
| 2018/0358018 A1 | 12/2018 | Piccolo, III | |
| 2018/0365092 A1 | 12/2018 | Linetskiy | |
| 2021/0149950 A1 | 5/2021 | Fourman et al. | |

FOREIGN PATENT DOCUMENTS

| | | |
|---|---|---|
| JP | 5534894 B2 | 7/2014 |
| KR | 20170112931 A | 10/2017 |
| KR | 102044119 B1 | 11/2019 |
| KR | 102195702 B1 | 12/2020 |

* cited by examiner

*Primary Examiner* — Joseph Saunders, Jr.
(74) *Attorney, Agent, or Firm* — Brooks, Cameron & Huebsch, PLLC

(57) ABSTRACT

Devices, systems, and methods for public address system action auditing are described herein. In some examples, one or more embodiments include a computing device comprising a memory and a processor to execute instructions stored in the memory to access an event log associated with an event in a facility, compare the event log with a predefined configuration file associated with a public address system of the facility, and generate a report about the event based on the comparison.

18 Claims, 2 Drawing Sheets

PUBLIC ADDRESS SYSTEM ACTION AUDITING

TECHNICAL FIELD

The present disclosure relates to devices, systems, and methods for public address system action auditing.

BACKGROUND

Facilities, such as commercial facilities, office buildings, hospitals, campuses (e.g., including buildings and outdoor spaces), and the like, may have an alarm system that can be triggered during an event, such as an emergency situation (e.g., a fire) to warn occupants to evacuate. Such an alarm system can include a public address system which can amplify and emit noises. Such noises may include human voices, pre-recorded messages, alarms, tones, and/or other audible sounds. The public address system can utilize microphone(s), amplifier(s), speaker(s), and/or other devices to emit such audible sounds. Additionally, while the public address system can emit noises in an emergency situation, the public address system can also emit noises to perform announcements, play music, and/or be utilized for any other purpose. Such a public address system can be sufficiently audible at a distance and/or over a large area, especially in an emergency situation.

DETAILED DESCRIPTION

Figure 1:
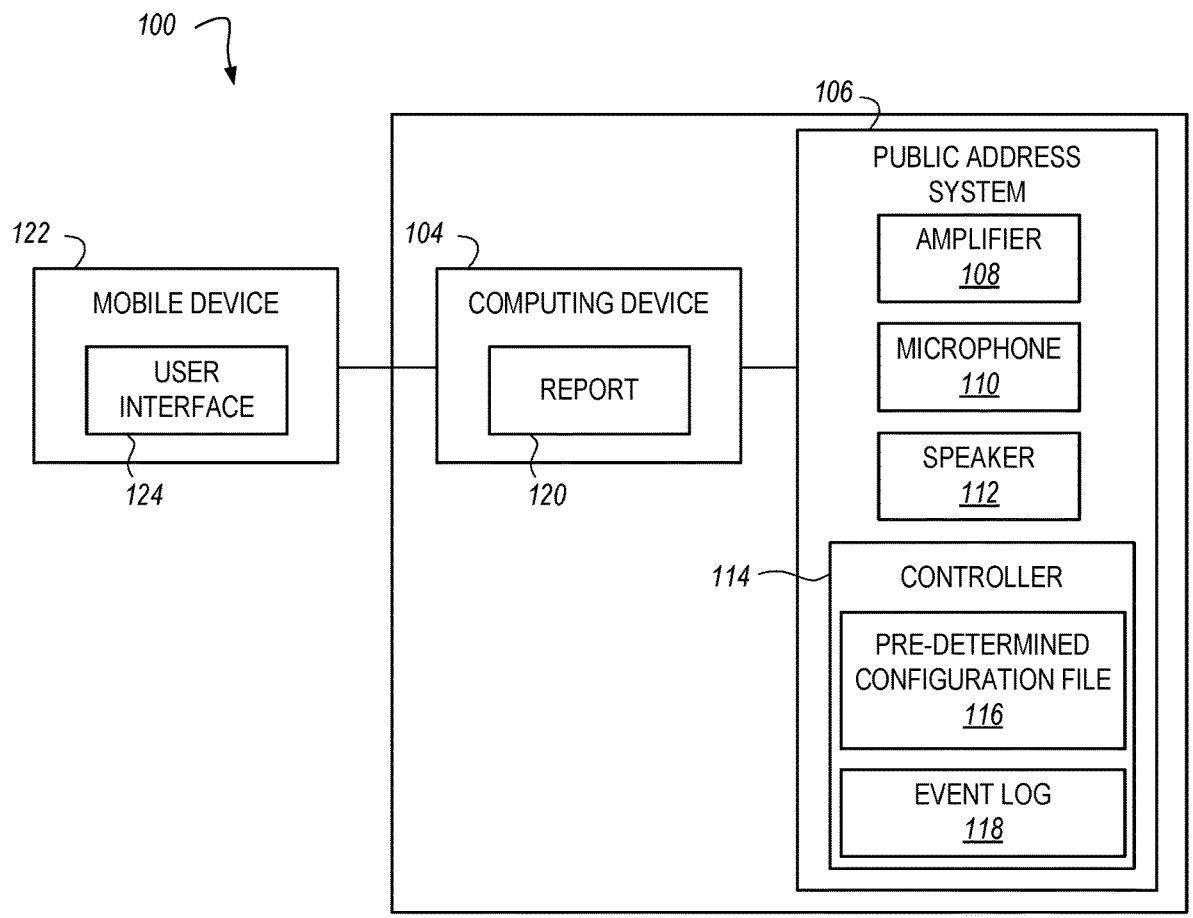
FIG. 1 is an example of a system for public address system auditing, in accordance with one or more embodiments of the present disclosure.

Devices, systems, and methods for public address system action auditing are described herein. In some examples, one or more embodiments include a computing device comprising a memory and a processor to execute instructions stored in the memory to access an event log associated with an event in a facility, compare the event log with a predefined configuration file associated with a public address system of the facility, and generate a report about the event based on the comparison.

In an event in which a public address system is utilized, an input is received which causes noise to be audibly output. For example, an event can cause a pre-recorded message to be amplified and transmitted to speakers for the speakers to audibly emit the pre-recorded message. In another example, a user may provide an input by speaking into a microphone, and the spoken message from the user can be received by the microphone, amplified, and transmitted to speakers for the speakers to audibly emit the spoken message from the user.

Some facilities may include logical expressions configured to cause the public address system to take actions. For example, in response to an event occurring, such as a fire, the public address system may take predefined actions defined according to logical expressions, such as sending a particular message for emission in one location and sending a different message for emission in another location. For example, if the facility includes five floors, a message can be sent to the fifth-floor detailing to occupants of the fifth floor how to evacuate and why, whereas a different message can be sent to the fourth-floor detailing to occupants of the fourth floor how to evacuate and why. Such messages may differ as different evacuation routes may exist for different floors/areas of a facility.

While such predefined actions may be set to occur, currently there is no mechanism to verify such predefined actions take place. For example, the message to be sent to the fifth-floor may not be sent and transmitted as a result of a fault in the public address system.

Public address system action auditing according to the present disclosure can allow for auditing of actions taken by a public address system in response to an event occurring. Such an approach can allow for determination of whether the public address system is properly functioning during installation and commissioning of the system, during normal operation of the facility, as well as whether the public address system functioned properly in response to an event, such as an emergency situation, occurring.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that process, electrical, and/or structural changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits. For example, 108 may reference element "08" in FIG. 1, and a similar element may be referenced as 208 in FIG. 2.

As used herein, "a", "an", or "a number of" something can refer to one or more such things, while "a plurality of" something can refer to more than one such things. For example, "a number of components" can refer to one or more components, while "a plurality of components" can refer to more than one component.

FIG. 1 is an example of a system 100 for public address system auditing, in accordance with one or more embodiments of the present disclosure. The system 100 can include a facility 102, a computing device 104, a public address system 106, and a mobile device 122.

As mentioned above, a facility 102 can be a building, a campus (e.g., building(s) with outdoor spaces), etc. and can include a public address system 106. As used herein, the term "public address system" refers to an electronic system to cause noise to be audibly output. The public address system 106 can be utilized at the facility 102 in order to amplify and emit audible noises, including pre-recorded messages, alarms, tones, and/or other audible sounds. Such audible noises may be emitted during an event, such as a public address, an emergency situation, etc.

The public address system 106 can include components to emit such audible noises, including an amplifier 108, microphone 110, and speaker 112. As used herein, the term "amplifier" refers to an electronic device that is configured to increase the power of an electrical signal. For example, the signal can be an audio signal that is to be emitted into the facility 102. As used herein, the term "microphone" refers to an electronic device that converts sound into an electrical signal. As used herein, the term "speaker" refers to an electronic device that converts an electrical signal into audible sound. In some examples, the microphone 110 can convert sound, such as a speaker's voice, into an electrical signal that can be amplified via the amplifier 108 and audibly emitted to the facility 102 via the speaker 112. In some examples, the amplifier 108 can amplify an electrical signal corresponding to a pre-recorded message or sound that can be audibly emitted to the facility 102 via the speaker 112. Such emission of voice and/or pre-recorded messages/sounds are further described herein.

Although the public address system 106 is illustrated in FIG. 1 as including a single amplifier 108, a single microphone 110, and a single speaker 112, embodiments of the present disclosure are not so limited. For example, the public address system 106 can include multiple amplifiers 108, multiple microphones 110, and/or multiple speakers 112.

As mentioned above, the public address system 106 can perform actions when an event occurs in the facility. As used herein, the term "event" refers to an occurrence. An event can be, for example, a non-emergency event (e.g., an announcement), an emergency event (e.g., a fire or other emergency), among other types of events.

As illustrated in FIG. 1, the public address system 106 can include a controller 114. The controller 114 is configured to cause the public address system 106 to perform predefined actions during an event. In an example in which the event is an emergency event (e.g., a fire), the controller 114 can cause the public address system 106 to emit instructions on where and how to evacuate the facility 102 (e.g., via the speaker 112), emit warning tones (e.g., via the speaker 112), among other predefined actions.

Such predefined actions can be performed according to a predefined configuration file 116 associated with the facility 102. As used herein, the term "configuration file" refers to a file used to configure parameters and settings that dictate actions taken by a computer program. For example, the predefined configuration file 116 can include parameters that cause the controller 114, upon an event occurring, to cause the public address system to perform predefined actions, as is further described herein.

In some examples, the event can be a fire. Causing the controller 114 to perform the predefined actions according to the parameters in the predefined configuration file 116 can include cause the speaker 112 to output a pre-recorded message. For example, the controller 114 can cause the speaker 112 to output a first pre-recorded message on a first floor of the facility 102 (e.g., "Proceed to nearest exit"), cause another speaker in the facility 102 to output a second pre-recorded message on a second floor of the facility 102 (e.g., "Proceed to east stairwell and move down one floor, exit facility from emergency exit"), etc. Additionally, if a message is received via the microphone 110 (e.g., a user speaks into the microphone 110), the controller 114 can cause the speaker 112 to output the message according to the parameters in the predefined configuration file 116 (e.g., a user says into the microphone 110 that "a fire is occurring on the third floor, please exit the facility"). Further, the controller 114 can cause the amplifier 108 to transmit an audio signal to the speaker 112 for output. For example, according to the parameters in the predefined configuration file 116, the amplifier 108 can amplify and/or transmit the pre-recorded messages to the speaker 112, any messages received via the microphone 110, and/or amplify and/or transmit any other audio signals to the speaker 112 for output.

As discussed above, the predefined configuration file 116 includes predefined actions to be taken by the public address system 106 during a fire event. However, embodiments of the present disclosure are not limited to a fire event. For example, the predefined configuration file 116 can include predefined actions to be taken by the public address system during an event of a particular event type. For instance, if the particular event type is an announcement (e.g., the facility 102 is closing), the predefined actions included in the predefined configuration file 116 can cause the controller 114 to cause the public address system 106 (e.g., the speaker 112) to broadcast, to the facility 102 (e.g., or an area of the facility 102), a pre-recorded message (e.g., "the facility is closing in five minutes, please exit the facility").

Although the event types are described above as being an emergency event (e.g., a fire) and an announcement, embodiments of the present disclosure are not so limited. For example, the event can be any other event.

As illustrated in FIG. 1, the predefined configuration file 116 can be stored at the controller 114. For example, the predefined configuration file 116 can be stored in memory (e.g., not illustrated in FIG. 1) of the controller 114, and a processor associated with the controller 114 can execute instructions (e.g., parameters) included in the predefined configuration file 116 to cause the public address system 106 to perform the predefined actions, as described above. However, embodiments of the present disclosure are not so limited to storing the predefined configuration file 116 locally at the controller 114. For example, the predefined configuration file 116 may be stored remotely at the computing device 104, remotely at a remote computing device (e.g., not illustrated in FIG. 1) such as a cloud server, and may be accessed by the controller 114 via a network relationship between the controller 114 and the remote computing device, etc.

As mentioned above, during an event, the public address system 106 is configured to perform predefined actions according to the predefined configuration file 116. In order to audit the actions of the public address system 106, the controller 114 can log the sequence of actions performed by the public address system 106 and store them in an event log 118. As used herein, the term "event log" refers to a file that includes information about the operations of a system. For example, the event log 118 can include information about a sequence of actions actually performed by the public address system 106. Utilizing the event log 118, the computing device 104 can determine whether the sequence of actions actually performed by the public address system 106 match with the predefined actions the public address system 106 is supposed to take according to the predefined configuration file 116, as is further described herein.

For example, during an event, the controller 114 can log the sequence of actions performed by the public address system 106 during the event in the event log 118. In the example in which the event is a fire, the sequence of actions performed by the public address system can correlate with predefined actions to be taken by the public address system. For instance, the controller 114 can log, in the event log 118, that the speaker 112 output a first pre-recorded message on the first floor of the facility 102 (e.g., "Proceed to nearest exit") and log that another speaker in the facility 102 output a second pre-recorded message on a second floor of the facility 102 (e.g., "Proceed to east stairwell and move down one floor, exit facility from emergency exit"). As another example, the sequence of actions performed by the public address system include actions taken by the public address system in response to a user input. For instance, the controller 114 can log, in the event log 118, that the log that the microphone 110 received a message from a user and that the amplifier 108 amplified and transmitted the received message to the speaker 112 for output, and that the speaker 112 output the message received by the microphone 110, etc. The message received by the user can be logged as a recording in the form of text and/or speech. Accordingly, such an event log can be a record of the actions actually taken by the public address system 106 during the event.

As illustrated in FIG. 1, the facility 102 can include a computing device 104. The computing device 104 can access the event log 118 in the facility 102. For example, the computing device 104 can connect, via a network relationship, to the event log 118 to view the sequence of actions performed by the public address system 106 during an event. Examples of such a network relationship can include a local area network (LAN), wide area network (WAN), personal area network (PAN), a distributed computing environment (e.g., a cloud computing environment), storage area network (SAN), Metropolitan area network (MAN), a cellular communications network, Long Term Evolution (LTE), visible light communication (VLC), Bluetooth, Worldwide Interoperability for Microwave Access (WiMAX), Near Field Communication (NFC), infrared (IR) communication, Public Switched Telephone Network (PSTN), radio waves, and/or the Internet, among other types of network relationships.

Utilizing the event log 118, the computing device 104 can compare the event log 118 with the predefined configuration file 116. For example, the computing device 104 can compare the predefined actions that the public address system 106 is supposed to take (e.g., included in the predefined configuration file 116) with the sequence of actions actually performed by the public address system 106 during the event (e.g., included in the event log 118). Based on the comparison, the computing device 104 can generate a report 120, as is further described herein.

The report 120 can be generated by the computing device 104 after comparing the event log 118 with the predefined configuration file 116 to determine how the public address system 106 performed against how the public address system 106 was supposed to perform based on an event occurring. As used herein, the term "report" refers to an account of a particular matter in textual and/or graphical form. For example, the report 120 can be an account of how the public address system 106 performed when an event occurs. The report 120 can include a sequence of actions performed by the public address system 106, information on whether the predefined actions taken match the sequence of actions performed, and/or other logged information. Other logged information may include a message received by a user that was amplified and transmitted to the speaker 112 for output. Such a message may be accessible via the report in a text format, can be converted to audio for playback (e.g., to listen to the verbal message delivered by the user), etc.

In some examples, the predefined actions to be taken (e.g., included in the predefined configuration file 116) can match the sequence of actions performed (e.g., included in the event log 118). For example, according to the predefined configuration file 116 in the event of a fire, the public address system 106 is to output a first pre-recorded message on a first floor of the facility 102 (e.g., "Proceed to nearest exit") via the speaker 112 and cause another speaker in the facility 102 to output a second pre-recorded message on a second floor of the facility 102 (e.g., "Proceed to east stairwell and move down one floor, exit facility from emergency exit"). In such an instance, the computing device 104 can determine that based on the event log 118 indicating that the public address system 106 did indeed output the first pre-recorded message on the first floor of the facility 102 via the speaker 112 and cause another speaker in the facility 102 to output the second pre-recorded message on a second floor of the facility 102, that the public address system 106 performed according to the predefined configuration file 116. Accordingly, the report 120 can reflect that the public address system 106 performed according to the predefined configuration file 116.

In some examples, the predefined actions to be taken (e.g., included in the predefined configuration file 116) may not match the sequence of actions performed (e.g., included in the event log 118). For example, according to the predefined configuration file 116 in the event of a fire, the public address system 106 is to output a first pre-recorded message on a first floor of the facility 102 (e.g., "Proceed to nearest exit") via the speaker 112 and cause another speaker in the facility 102 to output a second pre-recorded message on a second floor of the facility 102 (e.g., "Proceed to east stairwell and move down one floor, exit facility from emergency exit"). In such an instance, the computing device 104 can determine that based on the event log 118 indicating that the public address system 106 did not output the first pre-recorded message on the first floor of the facility 102 via the speaker 112, but did cause another speaker in the facility 102 to output the second pre-recorded message on a second floor of the facility 102, and as such that the public address system 106 did not perform according to the predefined configuration file 116. Accordingly, the report 120 can reflect that the public address system 106 did not perform according to the predefined configuration file 116. Additionally, the computing device 104 can include in the report 120 that a fault occurred with the public address system 106 during the event.

In response to the fault occurring, in some examples the computing device 104 can determine a component of the public address system 106 associated with the fault. For example, as described above, the comparison of the event log 118 and the predefined configuration file 116 indicated that the speaker 112 did not output the first pre-recorded message as was intended per the predefined configuration file 116. Accordingly, the computing device 104 can determine that the speaker 112 is associated with the fault. Such a component (e.g., the speaker 112) can be included in the report 120.

In some examples, the computing device 104 can generate a troubleshooting plan based on the fault. Such a troubleshooting plan can include possible resolutions in order to address and eliminate the fault. For example, the troubleshooting plan may include suggestions such as checking the wiring between the amplifier 108 and the speaker 112, checking the power to the speaker 112 (e.g., line or battery power), checking whether the speaker 112 is operational, etc.

In response to the fault occurring, in some examples the computing device 104 can determine a remedy for the fault and implement the remedy automatically. For instance, utilizing the example above in which according to the predefined configuration file 116 in the event of a fire, the public address system 106 is to output a first pre-recorded message on a first floor of the facility 102 (e.g., "Proceed to nearest exit") via the speaker 112 and cause another speaker in the facility 102 to output a second pre-recorded message on a second floor of the facility 102 (e.g., "Proceed to east stairwell and move down one floor, exit facility from emergency exit") and the computing device 104 determines that based on the event log 118 indicating that the public address system 106 did not output the first pre-recorded message on the first floor of the facility 102 via the speaker 112, but did cause another speaker in the facility 102 to output the second pre-recorded message on a second floor of the facility 102. Additionally, the computing device 104 may determine that coding that is supposed to cause the computing device to output the first pre-recorded message on the first floor of the facility 102 is faulty (e.g., causes the first pre-recorded message to be output on a third floor of the facility 102), the computing device can modify the code such that the first pre-recorded message is to output on the first floor of the facility 102. The computing device 104 can utilize various machine learning techniques in order to determine and implement such remedies (e.g., utilizing machine learning techniques to scan computer-readable code, determine faults in the code, implement fixes to the code, etc.).

The report 120 may be arranged according to various templates. As used herein, the term "template" refers to a particular format and structure of a file. For example, the report 120 may be arranged according to a predetermined template. The predetermined template may be defined according to a particular jurisdiction in which the facility 102 is located. For example, a particular jurisdiction (e.g., a State within the United States, a country, etc.) may specify a particular report template for auditing when an emergency event occurs. The report 120 may be arranged according to a predefined template that satisfies the specified report template for the jurisdiction in which the facility 102 is located.

While the report 120 is described above as being arranged according to a predetermined template, embodiments of the present disclosure are not so limited. For example, the predetermined template may be modified in order to satisfy another jurisdiction's template requirements, may be modified to include alternative information relevant for a user reviewing the report 120, etc.

In some examples, the report 120 can be used to "replay" the incident. For example, in response to an emergency event occurring, the public address system 106 is to respond by taking predefined actions included in the predefined configuration file 116. A user can replay the emergency event by selecting a particular date or time and viewing the actions taken by the public address system 106 at the particular date or time. For example, an emergency event may have occurred at the facility 102 between 9:15 AM and 11:30 AM on April 26. A user can select a time (e.g., 9:17 AM) and view the actions taken by the public address system 106 at 9:17 AM (e.g., initiate emergency announcement, play announcement on speaker 112). Further, the user may select a time period (e.g., 9:17 AM to 9:30 AM) and play forward or backwards the sequence of actions performed by the public address system according to the selected time period (e.g., at 9:17 AM, initiate emergency announcement, at 9:18 AM play announcement on speaker 112; at 9:19 AM, received message from a user via the microphone 110; at 9:19 AM, broadcast announcement from the user via speaker 112, etc.).

While such information can be replayed via the report 120, in some examples, the computing device 104 can cause the public address system 106 to replay the sequence of actions taken by performing them again in the facility 102. For example, the computing device 104 can cause the public address system to initiate an emergency announcement (e.g., the emergency announcement initiated at 9:17 AM), cause the speaker 112 to play the announcement (e.g., the announcement played by speaker 112 at 9:18 AM, etc.). Such a replay of events by the public address system 106 in the facility can allow a user, such as an engineer, investigator, etc. to observe the sequence of actions performed by the public address system.

As illustrated in FIG. 1, the report 120 can be stored at the computing device 104. However, embodiments of the present disclosure are not so limited. For example, the report 120 can be stored remotely from the computing device 104 (e.g., at the controller 114, at a remote computing device (e.g., not illustrated in FIG. 1), etc.

The system 100 can further include a mobile device 122. The mobile device 122 can be configured to access the computing device 104 in order to access the report 120. The mobile device 122 can access the computing device 104 via a network relationship between the computing device 104 and the mobile device 122. The mobile device 122 can display the report 120 on a user interface 124 of the mobile device 122.

Figure 2:
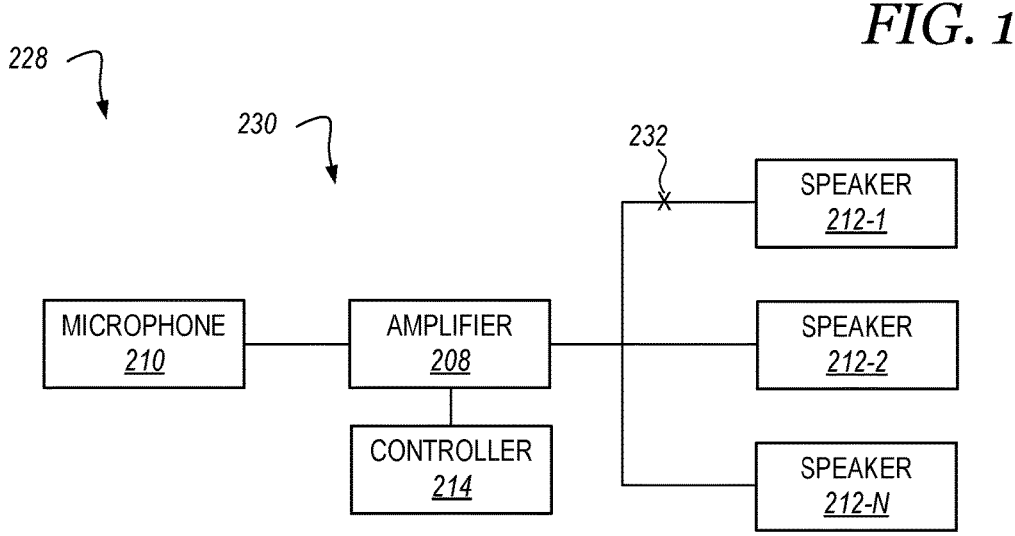
FIG. 2 is an example of a connection hierarchy included in a hierarchy of components in a generated report, generated in accordance with one or more embodiments of the present disclosure.

FIG. 2 is an example of a connection hierarchy 230 included in a hierarchy of components 228 in a generated report, generated in accordance with one or more embodiments of the present disclosure. The hierarchy of components 228 can include components of a public address system.

As illustrated in FIG. 2, the hierarchy of components 228 can include an amplifier 208, a microphone 210, speakers 212-1, 212-2, 212-N, and a controller 214. The hierarchy of components 228 are illustrated as a connection hierarchy 230. As used herein, the term "connection hierarchy" refers to an organization of components based on the interconnections therebetween. For example, the connection hierarchy 230 can show the connections between the components of the public address system (e.g., public address system 106, previously described in connection with FIG. 1).

Such a connection hierarchy 230 can be included in a report generated by a computing device after comparing an event log with a predefined configuration file to determine how the public address system performed against how the public address system was supposed to perform based on an event occurring. The connection hierarchy 230 can visualize the physical connections between the components of the public address system, as illustrated in FIG. 2.

As previously described in connection with FIG. 1, in some examples, the event log may not match up with the predefined configuration file, indicating that the public address system did not perform as it was supposed to during an event. For example, according to the predefined configuration file in the event of a fire, the public address system is to output a first pre-recorded message via the speaker 212-1, output a second pre-recorded message via the speaker 212-2, and output a third pre-recorded message via the speaker 212-N. Based on the comparison between the event log and the predefined configuration file, the computing device can determine that the speaker 212-1 did not output the first pre-recorded message and can indicate that a fault 232 occurred. The fault 232 can indicate that an issue has occurred between the amplifier 208 and the speaker 212-1, or that an issue has occurred with the speaker 212-1.

Accordingly, a user can visualize a location of the fault 232 using the connection hierarchy 230.

Figure 3:
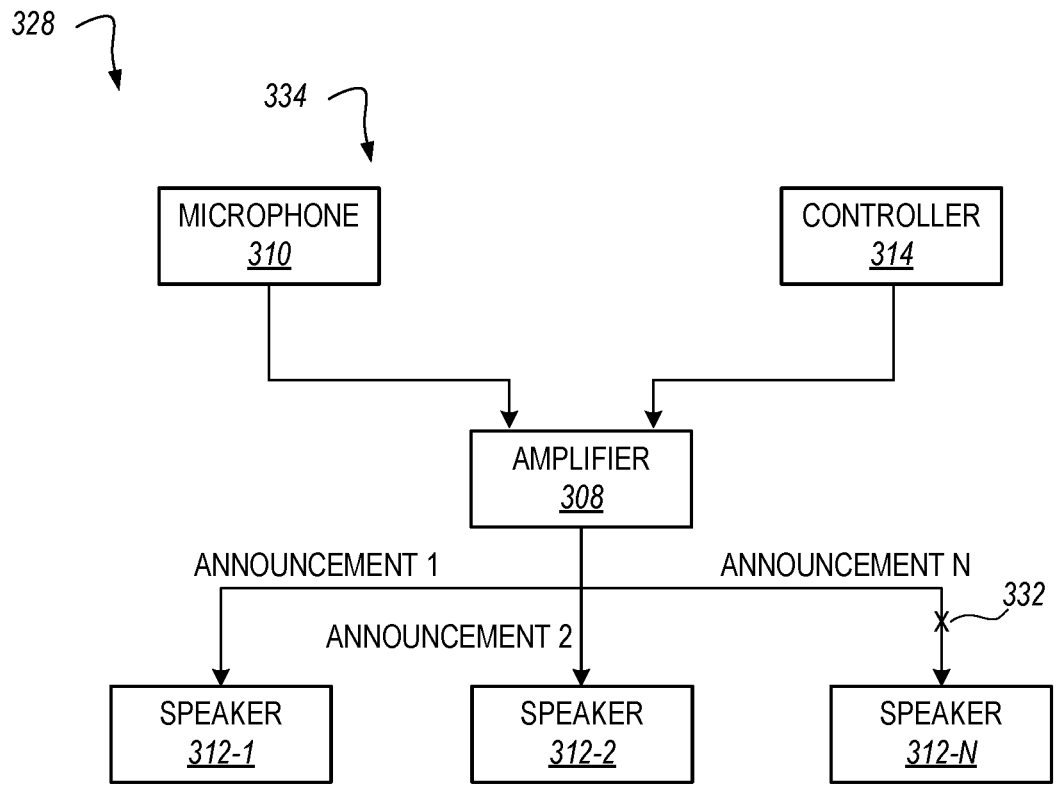
FIG. 3 is an example of a workflow hierarchy included in a hierarchy of components in a generated report, generated in accordance with one or more embodiments of the present disclosure.

FIG. 3 is an example of a workflow hierarchy 334 included in a hierarchy of components 328 in a generated report, generated in accordance with one or more embodiments of the present disclosure. The hierarchy of components 328 can include components of a public address system.

As illustrated in FIG. 3, the hierarchy of components 328 can include an amplifier 308, a microphone 310, speakers 312-1, 312-2, 312-N, and a controller 314. The hierarchy of components 328 are illustrated as a workflow hierarchy 334. As used herein, the term "workflow hierarchy" refers to an organization of components based on a sequence through which a signal passes. For example, the workflow hierarchy 334 can show the sequence of the components of the public address system (e.g., public address system 106, previously described in connection with FIG. 1) through which a signal (e.g., an electrical signal) flows.

Such a workflow hierarchy 334 can be included in a report generated by a computing device after comparing an event log with a predefined configuration file to determine how the public address system performed against how the public address system was supposed to perform based on an event occurring. The workflow hierarchy 334 can visualize signal transmission according to the predefined configuration file between the components of the public address system, as illustrated in FIG. 3.

As previously described in connection with FIG. 1, in some examples, the event log may not match up with the predefined configuration file, indicating that the public address system did not perform as it was supposed to during an event. For example, according to the predefined configuration file in the event of a fire, the public address system is to output a first pre-recorded message via the speaker 312-1, output a second pre-recorded message via the speaker 312-2, and output a third pre-recorded message via the speaker 312-N. Based on the comparison between the event log and the predefined configuration file, the computing device can determine that the speaker 312-1 did not output the first pre-recorded message and can indicate that a fault 332 occurred. The fault 332 can indicate that an issue has occurred between the amplifier 308 and the speaker 312-1, or that an issue has occurred with the speaker 312-1. Accordingly, a user can visualize a location of the fault 332 using the workflow hierarchy 334.

Public address system action auditing according to the present disclosure can allow for a public address system to be audited based on the actions it is supposed to take during an event. Auditing of such actions can allow for verification of correct actions taken to ensure safe and efficient operation of a facility. Such auditing can occur during installation and commissioning of the system as well as during normal operation of the facility to ensure that if an event such as an emergency event occurs, that proper messaging can occur within the facility to ensure safe transit of the facility by those inside. Further, such auditing can occur after an event occurs in order for post-event investigation.

Figure 4:
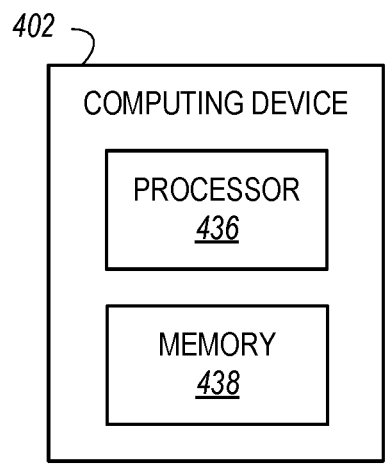
FIG. 4 is an example of a computing device for public address system auditing, in accordance with one or more embodiments of the present disclosure.

FIG. 4 is an example of a computing device 402 for public address system auditing, in accordance with one or more embodiments of the present disclosure. As illustrated in FIG. 4, the computing device 402 can include a memory 438 and a processor 436 for public address system auditing in accordance with the present disclosure.

The memory 438 can be any type of storage medium that can be accessed by the processor 436 to perform various examples of the present disclosure. For example, the memory 438 can be a non-transitory computer readable medium having computer readable instructions (e.g., executable instructions/computer program instructions) stored thereon that are executable by the processor 436 for public address system auditing in accordance with the present disclosure.

The memory 438 can be volatile or nonvolatile memory. The memory 438 can also be removable (e.g., portable) memory, or non-removable (e.g., internal) memory. For example, the memory 438 can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disc read-only memory (CD-ROM)), flash memory, a laser disc, a digital versatile disc (DVD) or other optical storage, and/or a magnetic medium such as magnetic cassettes, tapes, or disks, among other types of memory.

Further, although memory 438 is illustrated as being located within computing device 402, embodiments of the present disclosure are not so limited. For example, memory 438 can also be located internal to another computing resource (e.g., enabling computer readable instructions to be downloaded over the Internet or another wired or wireless connection).

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A computing device for public address system action auditing, comprising:
   a memory; and
   a processor configured to execute executable instructions stored in the memory to:
   access an event log associated with an event in a facility including a public address system having a plurality of components, wherein the event log includes a sequence of actions performed by the plurality of components of the public address system during the event;

compare the event log with a predefined configuration file associated with a public address system of the facility to determine whether the sequence of actions performed by each of the plurality of components matches predefined actions in the predefined configuration file the public address system is supposed to take during the event; and generate a report about the event based on the comparison.

2. The computing device of claim 1, wherein the sequence of actions performed by the plurality of components of the public address system include actions taken by the public address system in response to a user input.

3. The computing device of claim 1, wherein the predefined configuration file includes predefined actions the public address system is supposed to take during an event of a particular event type.

4. The computing device of claim 1, wherein the processor is configured to execute the instructions to compare the event log with the predefined configuration file by comparing the predefined actions the public address system is supposed to take during the event with the sequence of actions performed by the public address system during the event.

5. The computing device of claim 4, wherein in response to the predefined actions matching the sequence of actions performed, the processor is configured to execute the instructions to generate the report including that the public address system performed according to the predefined configuration file.

6. The computing device of claim 4, wherein in response to the predefined actions not matching the sequence of actions performed, the processor is configured to execute the instructions to generate the report including that a fault occurred with the public address system during the event.

7. A non-transitory computer readable medium having computer readable instructions stored thereon that are executable by a processor to:

access an event log associated with an event in a facility including a public address system having a plurality of components, wherein the event log includes a sequence of actions performed by the plurality of components of the public address system during the event;

compare the event log with a predefined configuration file associated with a public address system in the facility to determine whether the sequence of actions performed by each of the plurality of components matches predefined actions in the predefined configuration file the public address system is supposed to take during the event;

in response to the predefined configuration file not matching the event log, the processor is configured to execute the instructions to generate a report including that a fault occurred with the public address system during the event.

8. The computer readable medium of claim 7, wherein the computer readable instructions are executable by the processor to determine a component of the plurality of components of the public address system associated with the fault.

9. The computer readable medium of claim 8, wherein the component is included in the report.

10. The computer readable medium of claim 7, wherein the computer readable instructions are executable by the processor to generate the report including a hierarchy of the plurality of components comprising the public address system.

11. The computer readable medium of claim 10, wherein the hierarchy of the plurality of components includes a connection hierarchy to visualize physical connections between the plurality of components of the public address system.

12. The computer readable medium of claim 10, wherein the hierarchy of the plurality of components includes a workflow hierarchy to visualize signal transmission according to the predefined configuration file between the plurality of components of the public address system.

13. The computer readable medium of claim 7, wherein the computer readable instructions are executable by the processor to generate a troubleshooting plan based on the fault.

14. A system for public address system action auditing, comprising:

a public address system, wherein the public address system includes a plurality of components comprising:
an amplifier;
a microphone; and
a speaker;

a controller, wherein the controller is configured to:
cause the public address system to perform predefined actions according to a predefined configuration file during an event; and
log a sequence of actions performed by the plurality of components of the public address system during the event in an event log; and a computing device, wherein the computing device is configured to:
compare the event log with the predefined configuration file to determine whether the sequence of actions performed by each of the plurality of components matches the predefined actions in the predefined configuration file the public address system is supposed to take during the event; and
generate a report about the event based on the comparison.

15. The system of claim 14, wherein the controller is configured to cause the public address system to perform the predefined actions including at least one of:
causing the speaker to output a pre-recorded message;
causing the speaker to output a message received via the microphone; and
causing the amplifier to transmit an audio signal to the speaker for output.

16. The system of claim 14, wherein the predefined configuration file is stored at the controller or at the computing device.

17. The system of claim 14, wherein the report is stored at the computing device.

18. The system of claim 17, wherein:
the system further includes a mobile device; and
the mobile device is configured to access the computing device to display the report on a user interface of the mobile device.

* * * * *